United States Patent
Suganuma et al.

(10) Patent No.: US 11,523,299 B2
(45) Date of Patent: Dec. 6, 2022

(54) SENSOR DATA PROCESSING APPARATUS, SENSOR DATA PROCESSING METHOD, SENSOR DEVICE, AND INFORMATION PROCESSING APPARATUS

(71) Applicant: SONY CORPORATION, Tokyo (JP)

(72) Inventors: Hisahiro Suganuma, Tokyo (JP); Ryota Kimura, Tokyo (JP); Yoshihiro Wakita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 33 days.

(21) Appl. No.: 17/260,057

(22) PCT Filed: Jul. 26, 2019

(86) PCT No.: PCT/JP2019/029500
§ 371 (c)(1),
(2) Date: Jan. 13, 2021

(87) PCT Pub. No.: WO2020/031759
PCT Pub. Date: Feb. 13, 2020

(65) Prior Publication Data
US 2021/0289389 A1 Sep. 16, 2021

(30) Foreign Application Priority Data
Aug. 7, 2018 (JP) .............................. JP2018-148802

(51) Int. Cl.
*H04W 28/02* (2009.01)
*H04W 84/14* (2009.01)
*H04W 84/18* (2009.01)

(52) U.S. Cl.
CPC ... *H04W 28/0236* (2013.01); *H04W 28/0215* (2013.01); *H04W 84/18* (2013.01)

(58) Field of Classification Search
None
See application file for complete search history.

(56) References Cited

U.S. PATENT DOCUMENTS 9,311,403 B1 4/2016 Ioffe
10,075,353 B2 9/2018 Bullard et al.
(Continued)

FOREIGN PATENT DOCUMENTS

JP 2012-530467 A 11/2012
JP 2018-505477 A 2/2018
WO WO 2017/195325 A1 11/2017

OTHER PUBLICATIONS

Silberstein et al., Data-Driven Processing in Sensor Networks, CIDR 2007—3rd Biennial Conference on Innovative Data Systems Research, Jan. 2007, pp. 10-21.

*Primary Examiner* — Kenny S Lin
(74) *Attorney, Agent, or Firm* — Paratus Law Group, PLLC (57) ABSTRACT

This information processing apparatus includes a control unit that determines, on the basis of one or more pieces of sensor data generated by a sensor that measures an external environment and generates sensor data, whether to suppress transmission of the sensor data from the sensor. The control unit calculates a value related to a difference between a plurality of pieces of sensor data generated by the sensor at different points of time and determines whether to suppress the transmission of the sensor data from the sensor on the basis of the calculated value related to the difference.

14 Claims, 8 Drawing Sheets

(56) References Cited

U.S. PATENT DOCUMENTS

| | | | |
|---|---|---|---|
| 10,601,528 B2* | 3/2020 | Naiki | H04W 4/20 |
| 2007/0067742 A1* | 3/2007 | Takaoka | G01D 21/00 |
| | | | 715/850 |
| 2012/0197852 A1* | 8/2012 | Dutta | H04L 67/12 |
| | | | 707/E17.005 |
| 2012/0197856 A1* | 8/2012 | Banka | H04L 67/2885 |
| | | | 707/706 |
| 2012/0197911 A1* | 8/2012 | Banka | G06F 16/951 |
| | | | 707/754 |
| 2012/0226930 A1 | 9/2012 | Colban et al. | |
| 2014/0062669 A1* | 3/2014 | Mena | G06F 17/40 |
| | | | 340/10.5 |
| 2015/0050902 A1* | 2/2015 | Umeki | H04Q 9/00 |
| | | | 455/127.5 |
| 2016/0197999 A1 | 7/2016 | Chun et al. | |
| 2017/0337449 A1* | 11/2017 | Hamada | G06N 3/0481 |

* cited by examiner

SENSOR DATA PROCESSING APPARATUS, SENSOR DATA PROCESSING METHOD, SENSOR DEVICE, AND INFORMATION PROCESSING APPARATUS

CROSS REFERENCE TO PRIOR APPLICATION

This application is a National Stage Patent Application of PCT International Patent Application No. PCT/JP2019/029500 (filed on Jul. 26, 2019) under 35 U.S.C. § 371, which claims priority to Japanese Patent Application No. 2018-148802 (filed on Aug. 7, 2018), which are all hereby incorporated by reference in their entirety.

TECHNICAL FIELD

The present technology relates to a sensor data processing apparatus, a sensor data processing method, a sensor device, and an information processing apparatus that processes data of a sensor that measures an external environment.

BACKGROUND ART

In recent years, downsizing and power saving of IoT devices with sensors for measuring an external environment such as temperature, humidity, and atmospheric pressure and a wireless communication machine are advancing. Use cases where a plurality of such devices is arranged in an external environment measurement target space, and sensor data of an external environment measured by sensors of the respective IoT devices are uploaded to a server via a communication network has increased.

In such a use case, since the sensor data is transmitted from a large number of IoT devices to the server, the consumption speed and the consumption efficiency of the storage capacity of the server can be problematic. Especially, in a case where a large number of IoT devices are randomly scattered in a measurement target space, a plurality of IoT devices may be arranged at positions close to each other, such that duplicate or similar pieces of sensor data frequently occurs. Such duplicate or similar pieces of sensor data may wastefully consume the storage capacity of the server, wastefully consume the communication band, and wastefully consume the power in the IoT devices.

Patent Literature 1 has disclosed a technology in which a plurality of sensors is grouped in accordance with a sensor type, a sensor family having a matching sensor data pattern is determined for each group, a representative sensor is determined for each sensor family, and only the sensor data of the representative sensor is transmitted or received by a server in order to prevent duplicate sensor data from being stored in the server.

CITATION LIST

Patent Literature

Patent Literature 1: Japanese Unexamined Patent Application Publication No. 2018-505477

DISCLOSURE OF INVENTION

Technical Problem

However, in a technology of uploading sensor data of an external environment measured by a plurality of sensors to a server via a communication network, including a known technologies disclosed in Patent Literature 1 and the like, there still remains an unresolved problem and room for improvement.

It is an object of the present technology to provide a sensor data processing apparatus, a sensor data processing method, a sensor device, and an information processing apparatus that are capable of improving the utilization efficiency of various resources, improving the efficiency of processing, and solving various other problems in uploading sensor data generated by a sensor for measuring an external environment to a server.

Solution to Problem

In order to solve the above-mentioned problem, a sensor data processing apparatus of an embodiment according to the present technology includes a control unit that determines, on the basis of one or more pieces of sensor data generated by a sensor that measures an external environment and generates sensor data, whether to suppress transmission of the sensor data from the sensor.

The control unit may calculate a value related to a difference between a plurality of pieces of sensor data generated by the sensor at different points of time and determine whether to suppress the transmission of the sensor data from the sensor on the basis of the calculated value related to the difference.

The control unit may determine to suppress the transmission of the sensor data from the sensor in a case where the value related to the difference is smaller than a threshold value.

The control unit may calculate a probability of transmission stop or probability of transmission of the sensor data with respect to the value related to the difference, the probability being based on a predetermined probability distribution.

A probability distribution in which as the value related to the difference becomes smaller, the probability of transmission stop of the sensor data becomes higher or the probability of transmission becomes lower can be used as the predetermined probability distribution.

Alternatively, the predetermined probability distribution may be a probability distribution in which as the value related to the difference becomes smaller, the probability of transmission stop of the sensor data becomes lower or the probability of transmission becomes higher.

The control unit may determine whether to suppress the transmission of the sensor data from the sensor on the basis of a degree of congestion of a communication band.

Here, the control unit may calculate a probability of transmission stop or probability of transmission of the sensor data on the basis of the degree of congestion and a predetermined probability distribution.

As the predetermined probability distribution, a probability distribution in which as the degree of congestion becomes higher, the probability of transmission stop of the sensor data becomes higher or the probability of transmission becomes lower can be used.

Further, the sensor data processing apparatus according to the embodiment of the present technology may further include a data receiving unit that receives a plurality of pieces of sensor data of a plurality of sensors, in which the control unit calculates a degree of similarity between the plurality of pieces of sensor data for each cluster that spatially classifies the plurality of pieces of sensor data received on the basis of positions of the sensors and determines whether to suppress the transmission of the sensor data on the basis of the calculated degree of similarity.

Here, the control unit may perform control to suppress the transmission of the sensor data from the sensor other than one or some sensors of a plurality of sensors belonging to the cluster.

The control unit may calculate the degree of similarity by using local sensitivity hashing.

A sensor data processing method of another embodiment according to the present technology includes determining, on the basis of one or more pieces of sensor data generated by a sensor that measures an external environment and generates sensor data, whether to suppress transmission of the sensor data from the sensor.

A sensor device of another embodiment according to the present technology includes a control unit that determines, on the basis of one or more pieces of sensor data generated by a sensor that measures an external environment and generates sensor data, whether to suppress transmission of the sensor data from the sensor.

An information processing apparatus of another embodiment according to the present technology includes a control unit that determines, on the basis of one or more pieces of sensor data generated by a sensor that measures an external environment and generates sensor data, whether to suppress transmission of the sensor data from the sensor.

Advantageous Effects of Invention

As described above, in accordance with the present technology, it is possible to improve the utilization efficiency of various resources, improve the efficiency of processing, and solve various other problems in uploading sensor data generated by a sensor for measuring an external environment to a server.

MODE(S) FOR CARRYING OUT THE INVENTION

Figure 1:
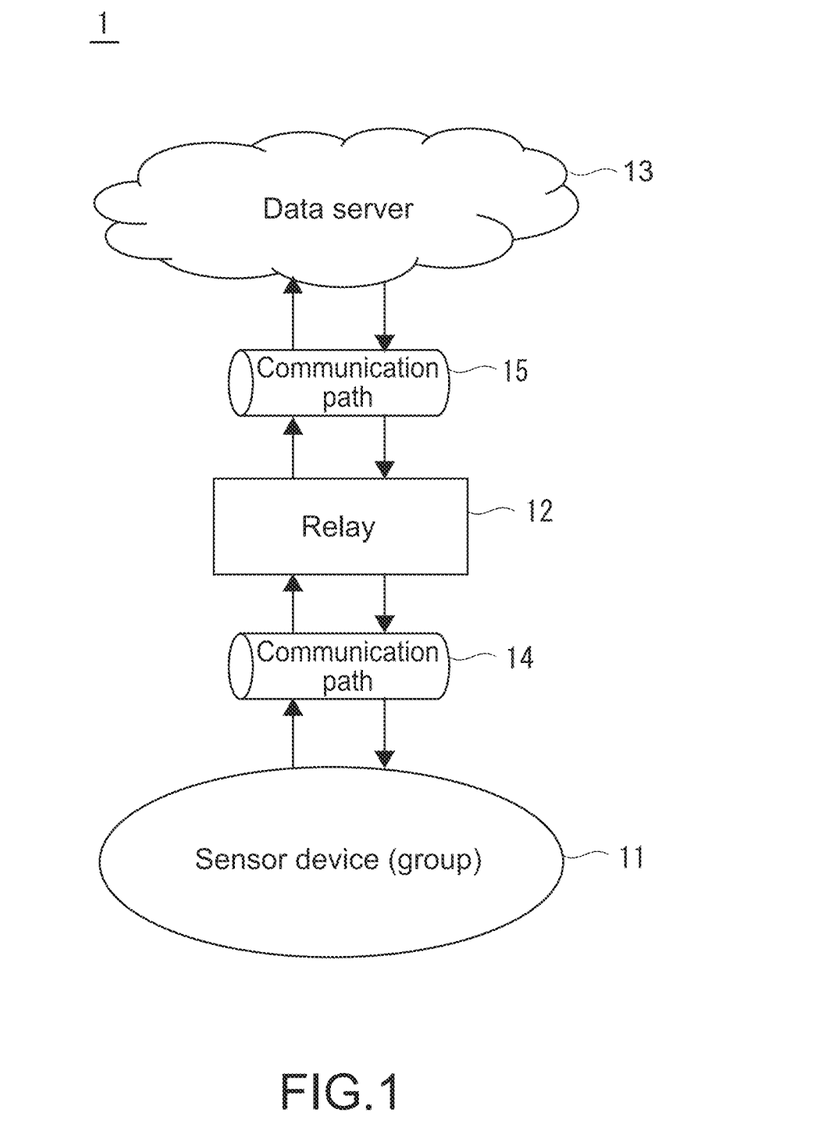
FIG. 1 A block diagram showing an overall configuration of a sensor system including a data server is a sensor processing apparatus of a first embodiment according to the present technology.

Embodiments according to the present technology will be described below. <First Embodiment>FIG. 1 is a block diagram showing an overall configuration of a sensor system of a first embodiment according to the present technology.

As shown in the figure, this sensor system 1 includes a group of sensor devices 11, a relay 12 such as a base station, and a data server 13 which is a sensor data processing apparatus. The sensor device 11 and the relay 12, and the data server 13 and the relay 12 can be connected to each other through communication paths 14 and 15.

The sensor device 11 may be an internet of things (IoT) sensor device. The sensor device 11 includes one or more sensors for measuring an external environment such as temperature, humidity, illuminance, and atmospheric pressure, a global positioning system (GPS) receiver for obtaining position information, a data transmitting unit, a control unit. The control unit has a central processing unit (CPU) and a main memory. The sensor device 11 includes measurement data of the external environment obtained by the one or more sensors and transmits the position information obtained by the GPS receiver to the relay 12 or the data server 13 through the communication path 14 as "sensor data".

It should be noted that the sensor device 11 may be an information processing terminal (personal computer, smartphone, mobile phone, tablet terminal, or the like), a wearable terminal (watch type, glasses type, wristband type, clip type, head-mounted display, or the like), an acoustic device (speaker, microphone, player device, or the like), a lighting device, a home electronic device (air conditioner, refrigerator, television device, or the like), an imaging device (camera, video camera, or the like), a measurement device (pressure meter, voltmeter, ammeter, displacement meter, luminometer, accelerometer, or the like), or the like.

The relay 12 combines and/or compresses a plurality of pieces of sensor data received from the group of sensor devices 11 via the communication path 14 and transmits the combined and/or compressed sensor data to the data server 13 via the communication path 15.

In this embodiment, the data server 13 corresponds to a sensor data processing apparatus or an information processing apparatus according to the present technology. That is, the data server 13 has a control unit that determines whether to suppress transmission of sensor data from at least one or some of the sensor devices 11 in the group of the sensor devices 11 on the basis of one or more pieces of sensor data generated by the sensor devices 11, and provides an instruction depending on the result to the sensor devices 11.

The communication paths 14 and 15 include an existing public wireless network such as 3 generation (3G), long term evolution (LTE), and a low power wide area (LPWA), and a closed area network such as Ethernet, a wireless local area network (LAN), or Bluetooth, for example.

(Configuration of Data Server 13)

The data server 13 includes one or more computers that can be connected to each other through a network. The data server 13 includes, for example, a central processing unit (CPU), a main memory, storage, a communication device, and the like. The main memory stores a program for operating the CPU as the data server 13 and data for processing.

Figure 2:
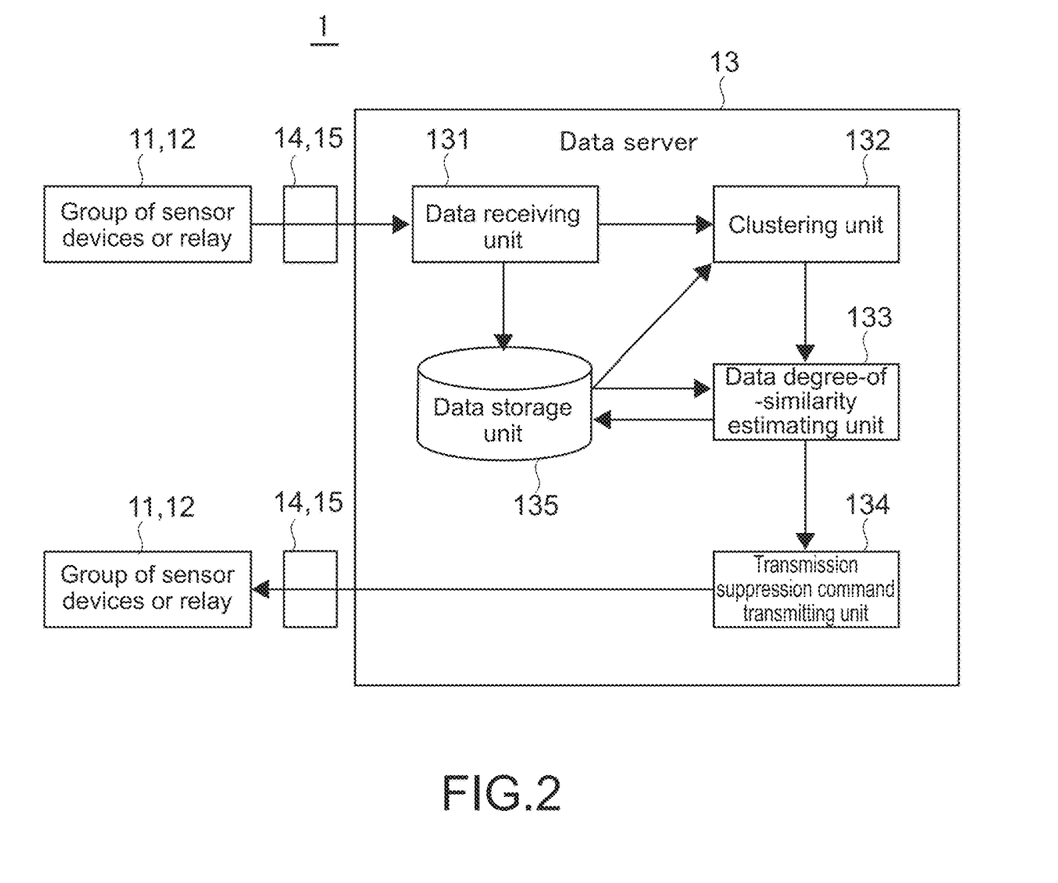
FIG. 2 A block diagram showing a functional configuration of a data server which is the sensor processing apparatus of the first embodiment according to the present technology.

FIG. 2 is a block diagram showing a functional configuration of the data server 13. The data server 13 functionally includes a data receiving unit 131, a clustering unit 132, a data degree-of-similarity estimating unit 133, a transmission suppression command transmitting unit 134, and a data storage unit 135. Here, the clustering unit 132, the data degree-of-similarity estimating unit 133, and the transmission suppression command transmitting unit 134 correspond to the above-mentioned control unit.

The data receiving unit 131 serves as a gateway for receiving the sensor data. The data receiving unit 131 stores the received sensor data in the data storage unit 135 or provides the received sensor data to the clustering unit 132.

The clustering unit 132 performs clustering of spatially classifying a plurality of pieces of sensor data on the basis of the position of the sensor device 11 on the basis of the position information included in each of the plurality of pieces of sensor data. Here, one set of pieces of sensor data classified by clustering is referred to as a "cluster". The clustering unit 132 provides the clustering result of the plurality of pieces of sensor data to the data degree-of-similarity estimating unit 133.

The clustering result of the sensor data is managed by cluster IDs respectively assigned to individual clusters and sensor data IDs respectively assigned to one or more pieces of sensor data belonging to one cluster. That is, the individual sensor data is identified and managed by a combination of the cluster ID and the sensor data ID.

The sensor data received by the data receiving unit 131 is stored in the data storage unit 135.

The data degree-of-similarity estimating unit 133 calculates a degree of similarity between the pieces of sensor data for each cluster. Here, the sensor data the degree-of-similarity of which is to be calculated can be the measurement data of the external environment measured by the sensors.

Figure 3:
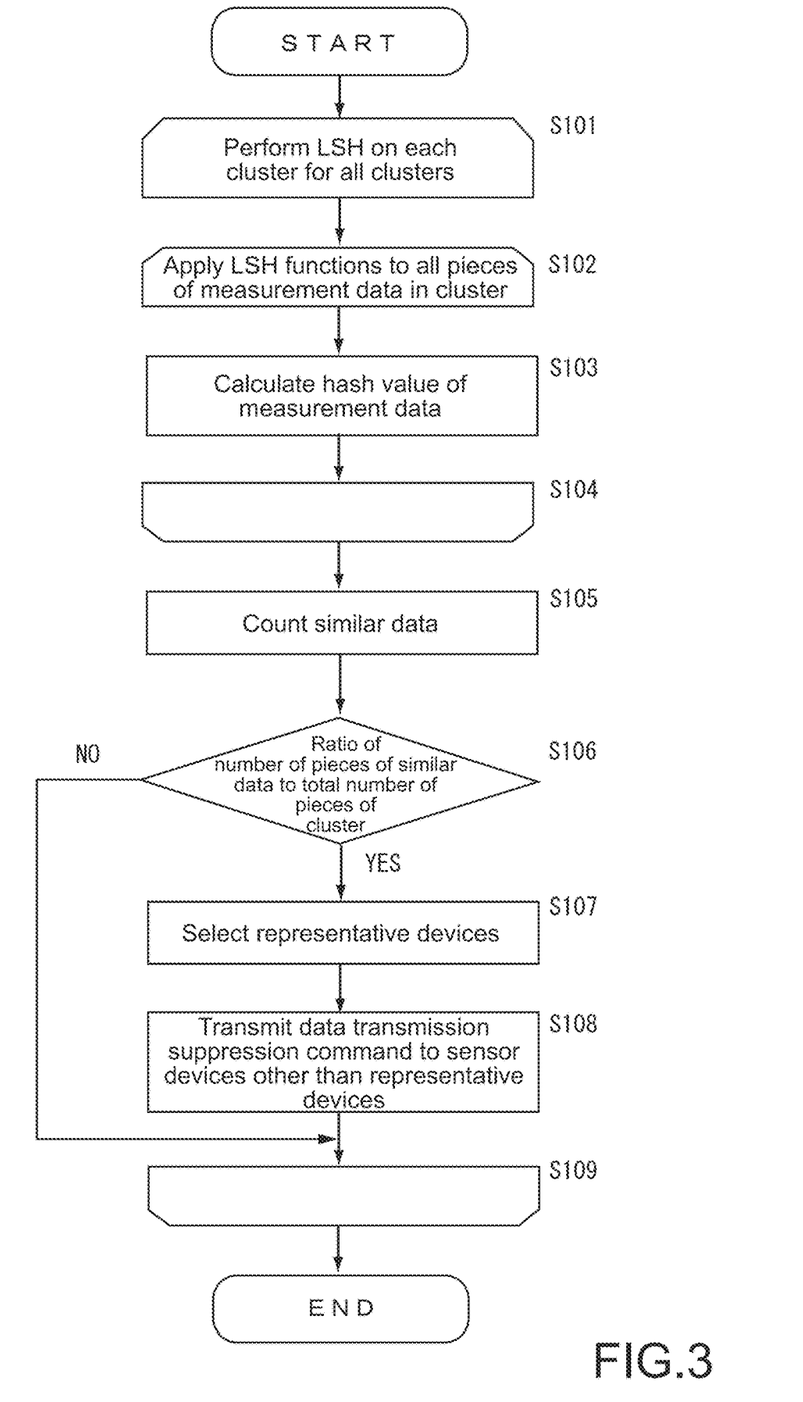
FIG. 3 A flowchart of an operation of estimating a degree of similarity between the pieces of sensor data for each cluster in the data server of FIG. 2.

FIG. 3 is a flowchart of an operation of estimating the degree of similarity between the pieces of sensor data. The data degree-of-similarity estimating unit 133 obtains hash values by applying local sensitivity hashing (LSH) functions or the like to all the pieces of sensor data in the cluster one by one (Steps S101 to S104).

By applying the local sensitivity hashing function, the same hash value is obtained for all the pieces of sensor data whose values are in a certain range in the cluster. For example, in a case where the sensor data is one-dimensional data such as temperature only and humidity only, the same hash value is obtained for all the pieces of sensor data having close one-dimensional values. Moreover, in a case where the sensor data is a two-dimensional value, such as a combination of temperature and humidity, or more N-dimensional value, the same hash value is obtained for a combination of pieces of sensor data having close distances in an N-dimensional space (e.g., Euclidean distance).

The data degree-of-similarity estimating unit 133 counts the number of pieces of sensor data for which the same hashing value is obtained in the cluster as the number of pieces similar data (Step S105). The data degree-of-similarity estimating unit 133 determines whether a ratio of the number of pieces of similar data obtained by counting to the total number of pieces of sensor data in the cluster exceeds a threshold value (YES in Step S106). In a case where the ratio of the number of pieces of similar data obtained by counting to the total number of pieces of sensor data in the cluster exceeds the threshold value, the data degree-of-similarity estimating unit 133 determines that the cluster is a cluster in which the degree of similarity between the pieces of sensor data belonging to the cluster is high and notifies the transmission suppression command transmitting unit 134 of the cluster ID of the cluster.

Now, a description will be given of the fact that the degree-of-similarity calculation method requires a smaller amount of calculation than a generally-used method.

In calculating the degree of similarity between the pieces of sensor data in the cluster, the total amount of calculation in a case of comparing N pieces of sensor data in the cluster to each other in all combinations is $O(N^2)$. On the other hand, in accordance with the degree-of-similarity calculation method to which the local sensitivity hashing function is applied, since it is only necessary to count the number of pieces of sensor data for which the same hash value is obtained, the total calculation amount is $O(N)$ and the load for calculation is greatly reduced.

When receiving the notification of the cluster ID, the transmission suppression command transmitting unit 134 selects one or more representative devices from among the one or more sensor devices 11 that are the transmission sources of the one or more pieces of sensor data belonging to the cluster corresponding to the notified cluster ID (Step S107) and transmits a data transmission suppression command to the one or more sensor devices 11 other than the one or more representative devices (Step S108).

Here, examples of the data transmission suppression command can include a command for stopping transmission of the sensor data, a command for adjusting a transmission frequency of the sensor data, a command for adjusting a transmission stop frequency of the sensor data, and the like. Moreover, examples of the method of selecting the representative devices can include a method of randomly selecting them, a method of selecting sensor devices 11 having close distances from the relay 12 as the representative devices, a method of selecting sensor devices 11 having large remaining battery levels as the representative devices, and the like.

As described above, by limiting the transmission of the sensor data from one or some of the sensor devices 11 belonging to the cluster in which the degree of similarity between the pieces of sensor data is high, it is possible to reduce the amount of communication for the duplicate or similar pieces of sensor data in the entire system. Accordingly, it is possible to improve the utilization efficiency of the storage capacity in the data server 13, to reduce the load on the sensor devices 11, and to save power by not transmitting sensor data having duplicate or similar contents to the data server 13.

Operation Example in Case Where Vehicle-Mounted Sensors are Used as Sensor Devices 11

Figure 4:
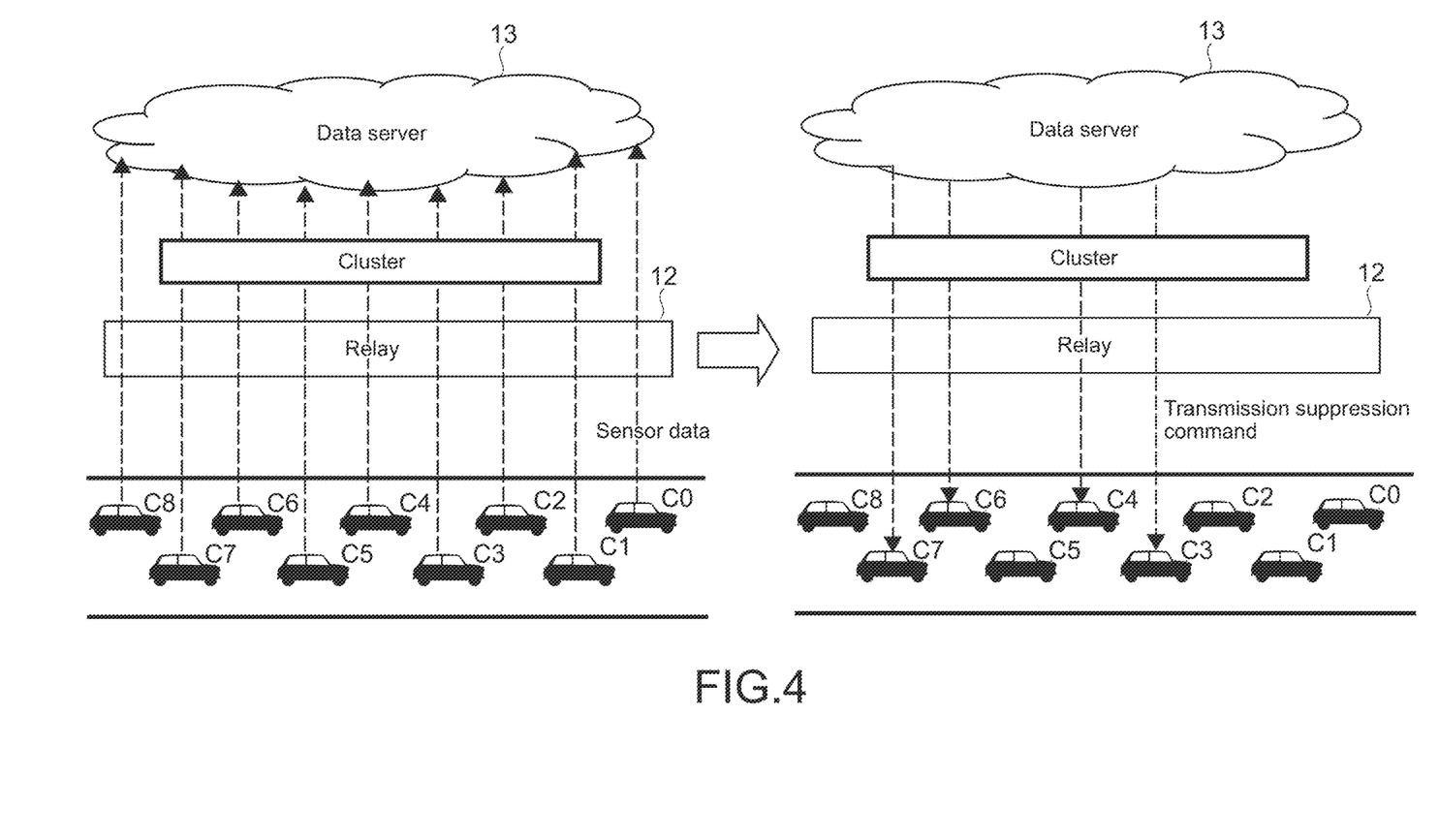
FIG. 4 A diagram showing a specific example of an operation of a sensor system 1 of the first embodiment. is a diagram.

FIG. 4 is a diagram showing a specific example of an operation of the sensor system 1 of the first embodiment.

Here, it is assumed that the sensor devices 11 are vehicle-mounted sensors that are mounted respectively on vehicles C0 to C8 and capable of measuring temperature, humidity, a road surface condition, and the like through sensors and obtaining position information by the GPS or the like.

Each vehicle-mounted sensor of the vehicles C0 to C8 transmits sensor data including measurement data and position information directly or via the relay 12 to the data server 13.

The data server 13 receives the sensor data transmitted directly from the vehicle-mounted sensor of each vehicles C0 to C8 or via the relay 12 through the data receiving unit 131, and performs clustering on the pieces of sensor data of the respective vehicles C0 to C8 through the clustering unit 132 on the basis of the position information included in each of the pieces of sensor data of the respective vehicles C0 to C8. It is assumed that as a result of clustering, pieces of sensor data of seven vehicles C1 to C7 out of the pieces of sensor data of the nine vehicles C0 to C8 shown in FIG. 4 are determined as one cluster.

The data degree-of-similarity estimating unit 133 in the data server 13 calculates degrees of similarity between the pieces of sensor data of the seven vehicles C1 to C7 determined as the one cluster and determines whether each of the degrees of similarity exceeds a threshold value. In a case where the degree of similarity exceeds the threshold value, the data degree-of-similarity estimating unit 133 determines the cluster as a cluster in which the degree of similarity between the pieces of sensor data is high and notifies the transmission suppression command transmitting unit 134 of the cluster ID of the cluster.

The transmission suppression command transmitting unit 134 selects one or more representative devices from among the vehicle-mounted centers of the seven vehicles C1 to C7 which are the output sources of the pieces of sensor data belonging to the cluster corresponding to the notified cluster ID (Step S107). In this example, it is assumed that the vehicle-mounted centers of the three vehicles C1, C2, and C5 are respectively selected as the representative devices. The transmission suppression command transmitting unit 134 transmits the data transmission suppression command to the vehicle-mounted centers of the four vehicles C3, C4, C6, and C7 other than the vehicle-mounted centers of the three vehicles C1, C2, and C5 selected as the representative devices.

Accordingly, the amount of communication for the duplicate or similar pieces of sensor data in the entire system can be reduced. Therefore, it is possible to improve the utilization efficiency of the storage capacity in the data server 13, to reduce the load on the sensor device 11, and to save power by not transmitting sensor data having duplicate or similar contents to the data server 13.

After a certain time from the transmission of the data transmission suppression command, the transmission suppression command transmitting unit 134 transmits a data transmission suppression cancel command to the vehicle-mounted centers of the four vehicles C3, C4, C6, and C7 to which the data transmission suppression command has been transmitted. Accordingly, transmission suppression of the sensor data from the vehicle-mounted centers of the four vehicles C3, C4, C6, and C7 are cancelled.

Moreover, even before the certain time has elapsed from the transmission of the data transmission suppression command, in a case where the vehicle, on which the vehicle-mounted sensor is mounted, as the transmission destination of the data transmission suppression command moves at a predetermined speed or higher, the transmission suppression state of the sensor data may be cancelled by determination with the vehicle-mounted sensor. Accordingly, it is possible to configure only the vehicle-mounted sensors of some vehicle selected as the representative devices out of the stopped vehicle or the vehicle at a low moving speed to be capable of transmitting the sensor data in case of traffic congestion, and the amount of communication for the duplicate or similar pieces of sensor data in the entire system can be reduced.

Second Embodiment (Transmission Suppression of Sensor Data by Sensor Device Itself Part I)

Although the method of determining, by the data server 13, whether to suppress the transmission of the sensor data from the sensor device 11 on the basis of the plurality of pieces of sensor data collected from the plurality of sensor devices 11, in particular, the measurement data of the external environment generated by the sensors has been described, the control unit of the sensor device may determine whether to suppress the transmission of the sensor data from the sensor device itself. That is, the sensor device of this embodiment corresponds to a sensor data processing apparatus or a sensor device according to the present technology.

In this embodiment, for example, while the sensor device repeats the generation of the sensor data periodically, for example, a difference between two pieces of sensor data continuous in time is taken and it is determined whether to limit the transmission of the sensor data from the sensor device itself on the basis of the value of this difference. More specifically, in a case where the value of the difference is small (the change of the measurement data is small), the transmission of the sensor data is limited, and in a case where the value of the difference is large, the transmission limitation is cancelled.

It should be noted that the two pieces of sensor data between which the difference is taken is not necessarily limited to those continuous in time, and it is sufficient that those are different in time.

Moreover, the two pieces of sensor data between which the difference is taken may be position information other than the measurement data measured by the sensors.

Figure 5:
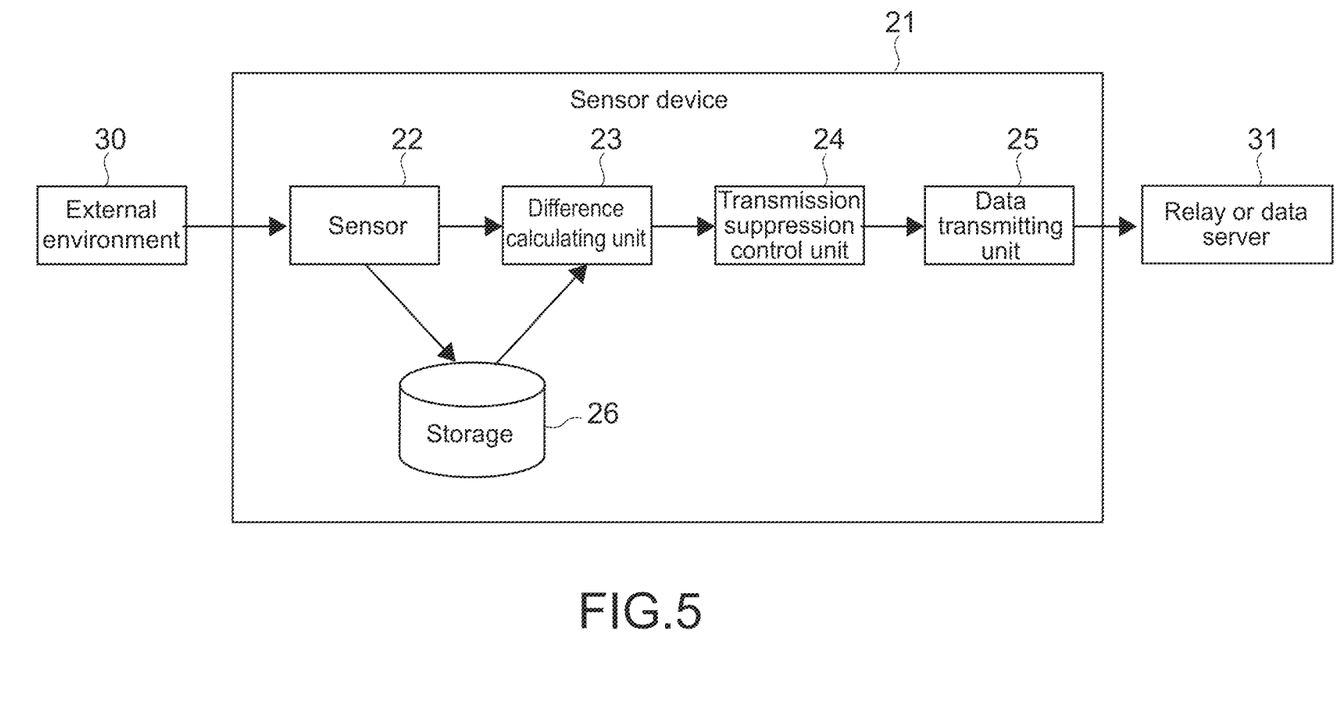
FIG. 5 A block diagram showing a configuration of a sensor device which is a sensor data processing apparatus of a second embodiment according to the present technology.

FIG. 5 is a block diagram showing a configuration of a sensor device 21 which is a sensor data processing apparatus of a second embodiment according to the present technology.

The sensor device 21 of this embodiment includes a sensor 22, a difference calculating unit 23, a transmission suppression control unit 24, a data transmitting unit 25, and storage 26 in the sensor device. Moreover, the sensor device 21 of this embodiment may include a GPS receiver (not shown) as one of sensors. Here, the difference calculating unit 23 and the transmission suppression control unit 24 corresponds to the above-mentioned control unit.

The sensor 22 measures an external environment 30 such as temperature, humidity, illuminance, atmospheric pressure, and position to generate sensor data. The sensor data generated by the sensor 22 is stored in the storage 26 in the sensor device and provided to the difference calculating unit 23 for calculating a difference from sensor data generated in the next cycle.

The difference calculating unit 23 calculates a value relating to a difference between the latest sensor data generated by the sensor 22 and the past sensor data such as, for example, sensor data one cycle before stored in the storage 26 in the sensor device. Here, examples of the value relating to the difference can include a difference value, a moving average value of differences, and the like.

The transmission suppression control unit 24 determines whether to suppress the transmission of the sensor data from the sensor device 21 itself on the basis of the value relating to the difference calculated by the difference calculating unit 23. Here, the suppression of the transmission of the sensor data specifically means to stop the transmission of the sensor data, to adjust transmission frequency of the sensor data, and the like.

The data transmitting unit 25 transmits the sensor data generated by the sensor 22 to the relay or the data server 31 through a communication path. The data transmitting unit 25 may read and transmit the sensor data from the storage 26 in the sensor device or may directly transmit the sensor data generated by the sensor 22.

The difference calculating unit 23, the transmission suppression control unit 24, the data transmitting unit 25, and the like can be configured as a controller such as a CPU.

The storage 26 in the sensor device stores the sensor data generated by the sensor 22. Moreover, In the sensor device 21 of this embodiment, the difference calculating unit 23 calculates a value relating to the difference between the latest sensor data generated by the sensor 22 and the past sensor data such as, for example, sensor data one cycle before stored in the storage 26 in the sensor device. Here, it is assumed that the value relating to the difference is a simple difference value. In this case, in a case where the difference value is smaller than the threshold value, the transmission suppression control unit 24 considers that there is no significant change in the external environment 30 and performs control to suppress the transmission of the sensor data by the data transmitting unit 25.

Similarly, here also in a case where the value relating to the difference is the moving average value of the differences, in a case where the moving average value is smaller than a threshold value for the moving average value, the transmission suppression control unit 24 considers that there is no significant change in the external environment 30 and performs control to suppress the transmission of the sensor data by the data transmitting unit 25.

Accordingly, it is possible to reduce the amount of communication for the sensor data including duplicate or similar pieces of measurement data in the entire system, and it is possible to improve the utilization efficiency of the storage capacity in the data server 13, reduce the load on the sensor device 11, and save power.

It should be noted that by configuring each of sensor devices 21 to perform the control of the transmission suppression of the sensor data, there is a possibility that the transmission of the sensor data from all the sensor devices 21 under similar external environments 30 is stopped. If the transmission of the sensor data of all the sensor devices 21 is stopped in this manner, an operational problem in that it becomes difficult for the relay or the data server 31 to determine whether the reason why the sensor data is not received is because the transmission of the sensor data has been stopped from all the sensor devices 21 or because another circumstance such as a communication failure has occurred, for example, may arise. Therefore, if a communication failure has occurred, it takes a long time to recover from the failure because it cannot be quickly found.

Therefore, it is desirable that the sensor device 21 calculate a transmission stop probability based on a predetermined probability distribution with respect to the value relating to the difference such as the difference value calculated by the difference calculating unit 23 and the moving average value of the differences and suppress the transmission of the sensor data in accordance with the transmission stop probability through the transmission suppression control unit 24. Accordingly, the situation where the transmission of the sensor data from all the sensor devices 21 is stopped does not occur, and it is possible for the relay or the data server 31 to consider the fact that the sensor data is not transmitted from all the sensor devices 21 as the occurrence of a communication failure or the like.

For example, $f(x:\lambda)=\lambda \exp(-\lambda x)$, which is a generally-used exponential distribution, or the like can be employed as the probability distribution used for calculating the transmission stop probability, though the present technology is not limited thereto.

Moreover, although here the transmission stop probability is calculated, a transmission probability or a transmission restart probability may be calculated using the probability distribution and the sensor data may be transmitted or the transmission of the sensor data may be restarted in accordance with the transmission probability or the transmission restart probability.

Examples of the probability distribution that can be employed in this case can include the inverse of the probability distribution used for calculating the above-mentioned transmission stop probability, that is, $1-f(x:\lambda)$ and the like, though the present technology is not limited thereto.

Specific Example of Sensor Data Transmission Suppression Control in Case Where Ambient Event Changes Next, it will be described that the transmission suppression control of the sensor data can be performed on the basis of a difference between pieces of sensor data caused by a change of an event around the sensor device 21 even in a case where the position of the sensor device 21 does not change.

Figure 6:
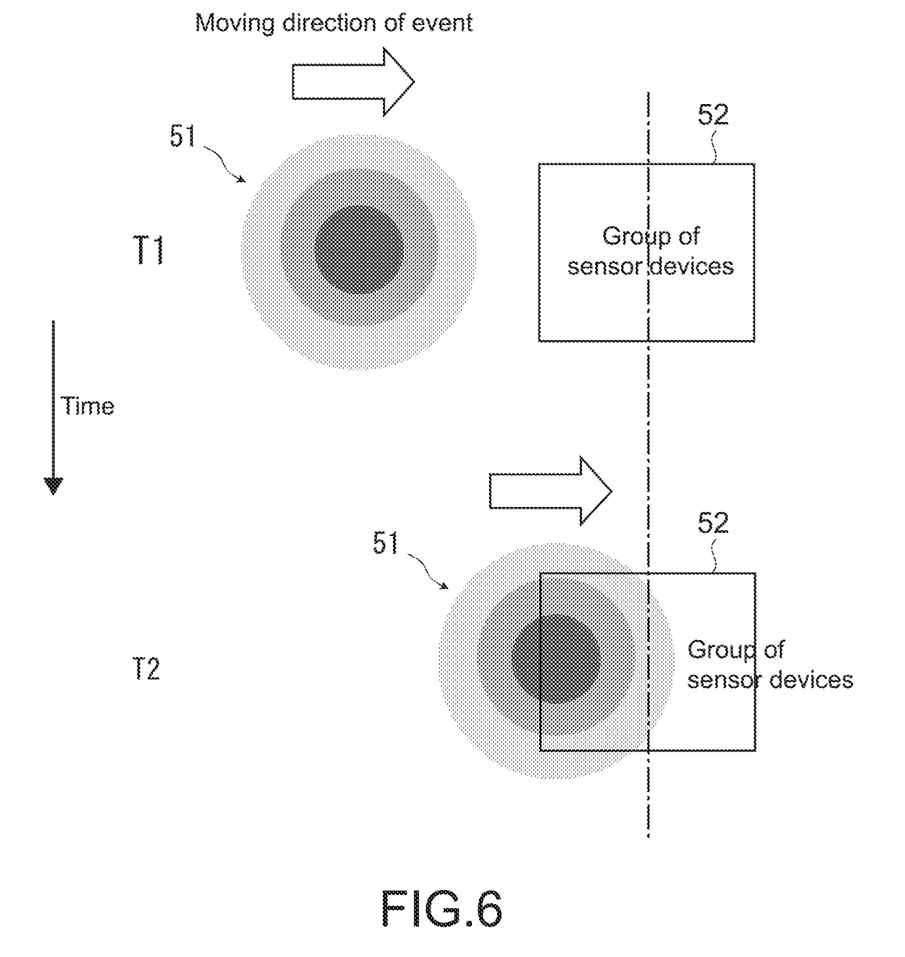
FIG. 6 A diagram for describing a specific example of transmission suppression control of the sensor data in a case where a surrounding event changes in the second embodiment.

FIG. 6 is a diagram showing a case where a changing event 51 around the sensor device 21 is a weather phenomenon, such as rainfall and wind speed, and a state in which this event 51 gradually approaches a region 52 in which a group of sensor devices 21 is located and passes through the region 52 over time.

It is assumed that the intensity of the changing event 51 increases toward the center. At the point of time T1 of FIG. 6, since the event 51 and the region 52 in which the group of sensor devices 21 is located is in a remote positional relationship, the difference value (or the moving average value of the differences) between the pieces of sensor data generated by the respective sensor devices 21 is still small. Thus, the transmission of the sensor data from each sensor device 21 is stopped with a relatively high probability, which results in a low amount of communication for the duplicate or similar pieces of sensor data in the entire system.

At the point of time T2 of FIG. 6, the changing event 51 is shown just passing through the region 52 in which the group of sensor devices 21 is located. At this time, the difference value (or the moving average value of the differences) between the pieces of sensor data generated by the respective sensor devices 21 increases. Therefore, the sensor data from each sensor device 11 is transmitted with a high probability.

Modified Example of Transmission Suppression Control in Case where Difference Between Pieces of Sensor Data is Small Until now, it has been described that the control to increase the transmission stop probability of the sensor data as the difference value between the pieces of sensor data (or the moving average value of the differences) becomes smaller, the transmission stop probability of the sensor data (higher transmission probability) may be lowered as the difference value between the pieces of sensor data (or the moving average value of the differences) becomes smaller.

For example, in a case where the sensor devices 21 hardly move (the amount of change (difference) of the position information per unit time is equal to or less than the threshold value), the transmission probability of the sensor data may be increased.

It is assumed that the plurality of sensor devices 21 on which such control is performed are scattered in a place where water flows, such as a river and a sea. In this assumption, the amount of change in positions of a sensor device 21 of the plurality of sensor devices 21 scattered, which reaches a stagnant point, for example a stagnant basin or a boundary of water masses, decreases, and the transmission probability of the sensor data from the sensor device 21 the amount of change of which is lower than a threshold value increases.

The data server 13 is capable of performing tracking processing or the like of the sensor devices 21 in the stagnant state on the basis of the position information of the sensor devices 21 included in the received sensor data. For example, for the purpose of recovery or the like of the sensor device 21, it is possible to direct a flying object such as a drone to the stagnant point of the sensor device 21, for example.

Third Embodiment (Transmission Suppression of Sensor Data by Sensor Device Itself Part II)

Next, a method for determining, by the control unit of the sensor device, whether to suppress the transmission of the sensor data from the sensor device itself on the basis of a degree of congestion of the communication band, will be described.

Figure 7:
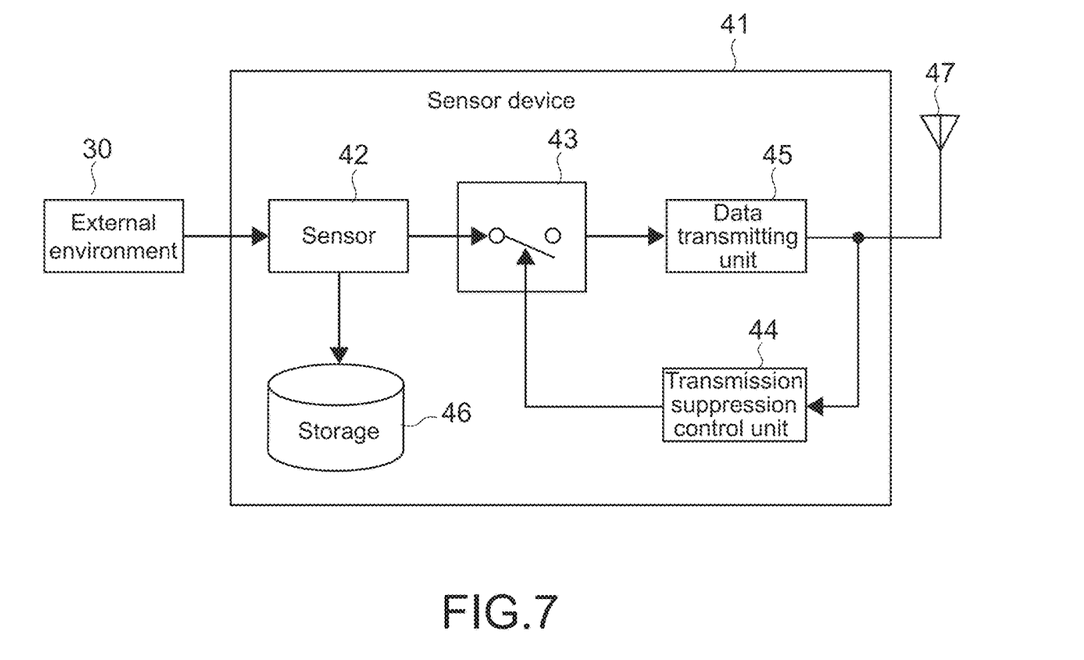
FIG. 7 A block diagram showing a configuration of a sensor device of a third embodiment according to the present technology.

FIG. 7 is a block diagram showing a configuration of a sensor device 41 according to a third embodiment of the present technology.

The sensor device 41 includes a sensor 42, a switch 43, a data transmitting unit 44, a transmission suppression control unit 45, storage 46 in the sensor device, and an antenna 47.

In the sensor device 41 of this embodiment, the transmission suppression control unit 45 determines whether to suppress the transmission of the sensor data from the sensor device itself on the basis of the degree of congestion of the communication band. That is, the sensor device 41 of this embodiment corresponds to the sensor data processing apparatus or the sensor device according to the present technology.

The sensor 42 measures an external environment 30 such as temperature, humidity, illuminance, atmospheric pressure, a position, and the like to generate the sensor data. The sensor data generated by the sensor 42 is stored in the storage 46 in the sensor device and provided to the switch 43.

The switch 43 switches on/off of the output of the sensor data provided from the sensor 42 to the data transmitting unit 44 in response to a command from the transmission suppression control unit 45.

The data transmitting unit 44 wirelessly transmits the sensor data input from the switch 43 through the antenna 47.

The transmission suppression control unit 45 measures the strength (RSSI: received signal strength indication) of transmitted radio waves of other sensor devices received by the antenna 47, estimates a distance between each of the other sensor devices on the basis of the RSSI measured result, calculates a ratio of the number of other sensor devices the estimated distance of which is smaller than a threshold value to the total number of sensor devices as the degree of congestion, and switching on/off control of the switch 43 so as to perform the transmission suppression of the sensor data on the basis of the degree of congestion.

Next, the details of degree-of-congestion calculation by the transmission suppression control unit 45 will be described.

Figure 8:
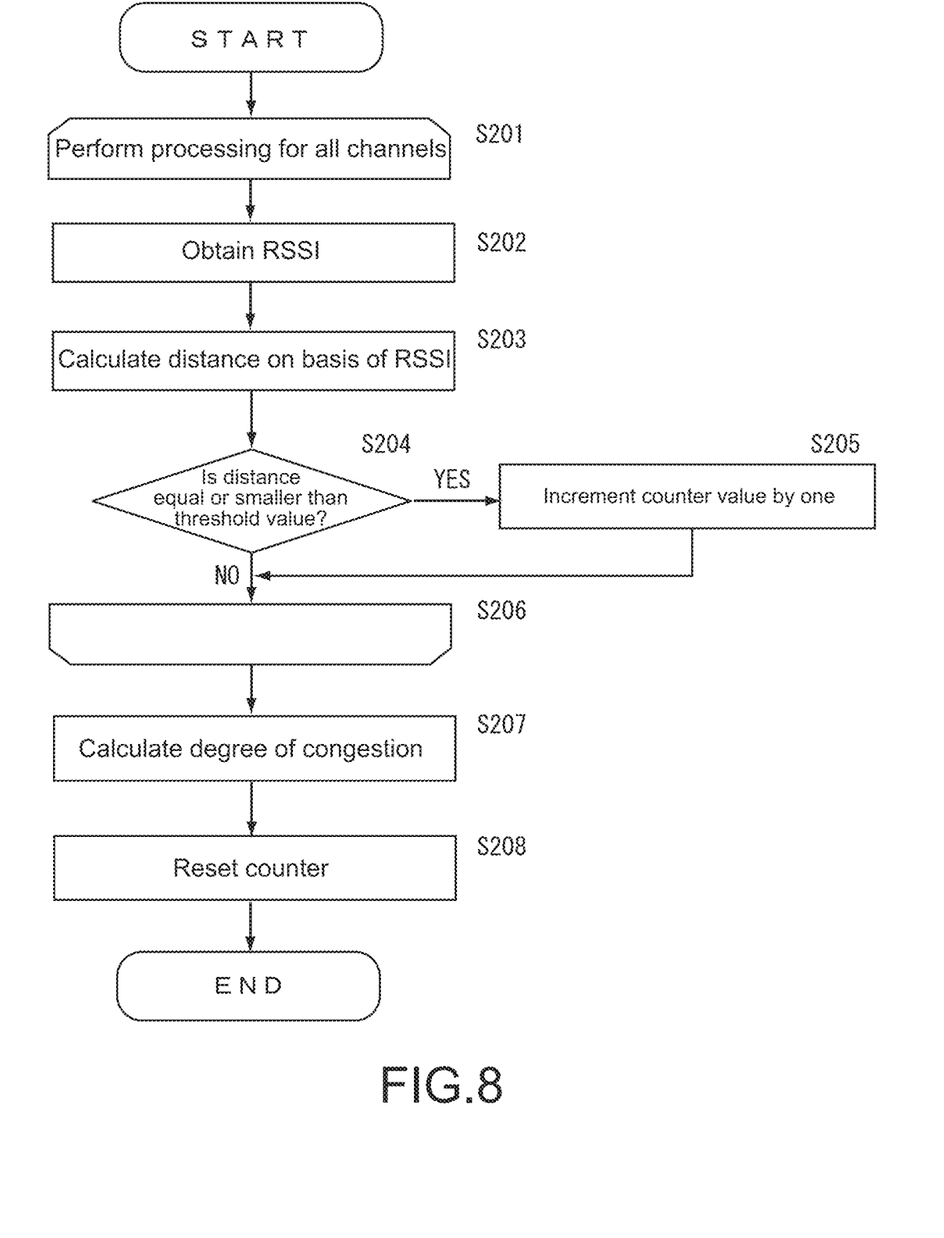
FIG. 8 A flowchart of degree-of-congestion calculation by a transmission suppression control unit in the third embodiment.

FIG. 8 is a flowchart of the degree-of-congestion calculation by the transmission suppression control unit 45.

The transmission suppression control unit 24 measures, for all channels for transmission used in wireless communication, reception strength (RSSI: received signal strength indication) of radio waves transmitted from the other sensor devices (Step S202).

Next, the transmission suppression control unit 24 calculates, on the basis of the measured RSSI, a distance D to each of the sensor devices 11 that are the radio wave transmitting sources (Step S203).

The distance D is calculated by the following equation, for example.

$$D = 10^{((Pt-Pr)/20)}$$

Here, Pt denotes known (predetermined) transmission power of the sensor device and Pr denotes reception strength (RSSI) of the radio wave.

Next, the transmission suppression control unit 24 counts the number of channels for which the distance D calculated as described above is equal to or lower than a threshold value (Steps S204 to S205). The transmission suppression control unit 24 repeats the above-mentioned processing for all transmission channels (Steps S201 to S206).

The transmission suppression control unit 24 calculates a degree of congestion of the communication band on the basis of the value of the ratio of the number of channels to the total number of channels, which is the count result obtained by repeating the above-mentioned processing for all the transmission channels (Step S207) and resets the counter (Step S208). The above is the description of the degree-of-congestion calculation.

In the transmission suppression control unit 24, a probability distribution of data transmission stop with respect to the degree of congestion of the communication band is preset. The transmission suppression control unit 24 calculates the data transmission stop probability on the basis of the estimated degree of congestion and the probability distribution of the data transmission stop. The transmitting unit performs switching on/off control of the switch 43 in accordance with this data transmission stop probability.

For example, $f(x;\lambda) = \lambda \exp(-\lambda x)$, which is a generally-used exponential distribution, can be employed as the probability distribution of the data transmission stop used in the transmission suppression control unit 24, though the present technology is not limited thereto.

Moreover, although the data transmission stop probability is calculated on the basis of the probability distribution of the data transmission stop, the data transmission probability may be calculated on the basis of the probability distribution of the data transmission. Examples of the probability distribution that can be employed in this case can include the inverse of the probability distribution of the data transmission stop, that is, $1-f(x;\lambda)$ or the like, though the present technology is not limited thereto.

It should be noted that the present technology may also take the following configurations.

(1) A sensor data processing apparatus, including
a control unit that determines, on the basis of one or more pieces of sensor data generated by a sensor that measures an external environment and generates sensor data, whether to suppress transmission of the sensor data from the sensor.

(2) The sensor data processing apparatus according to (1), in which
the control unit calculates a value related to a difference between a plurality of pieces of sensor data generated by the sensor at different points of time and determines whether to suppress the transmission of the sensor data from the sensor on the basis of the calculated value related to the difference.

(3) The sensor data processing apparatus according to (2), in which the control unit determines to suppress the transmission of the sensor data from the sensor in a case where the value related to the difference is smaller than a threshold value.

(4) The sensor data processing apparatus according to (3), in which the control unit calculates a probability of transmission stop or probability of transmission of the sensor data with respect to the value related to the difference, the probability being based on a predetermined probability distribution.

(5) The sensor data processing apparatus according to (4), in which the predetermined probability distribution is a probability distribution in which as the value related to the difference becomes smaller, the probability of transmission stop of the sensor data becomes higher or the probability of transmission becomes lower.

(6) The sensor data processing apparatus according to (4), in which the predetermined probability distribution is a probability distribution in which as the value related to the difference becomes smaller, the probability of transmission stop of the sensor data becomes lower or the probability of transmission becomes higher.

(7) The sensor data processing apparatus according to (1), in which the control unit determines whether to suppress the transmission of the sensor data from the sensor on the basis of a degree of congestion of a communication band.

(8) The sensor data processing apparatus according to (7), in which the control unit measures strength of a transmitted radio wave of another sensor data processing apparatus, estimates a distance from the other sensor data processing apparatus on the basis of this measurement result, and calculates a ratio of the number of other sensor data processing apparatuses the estimated distance of which is smaller a threshold value to the total number of sensor data processing apparatuses as the degree of congestion.

(9) The sensor data processing apparatus according to (8), in which the control unit calculates a probability of transmission stop or probability of transmission of the sensor data, the probability being based on the degree of congestion and a predetermined probability distribution.

(10) The sensor data processing apparatus according to (9), in which the predetermined probability distribution is a probability distribution in which as the degree of congestion becomes higher, the probability of transmission stop of the sensor data becomes higher or the probability of transmission becomes lower.

(11) The sensor data processing apparatus according to (1), further including a data receiving unit that receives a plurality of pieces of sensor data of a plurality of sensors, in which the control unit calculates a degree of similarity between the plurality of pieces of sensor data for each cluster that spatially classifies the plurality of pieces of sensor data received on the basis of positions of the sensors and determines whether to suppress the transmission of the sensor data on the basis of the calculated degree of similarity.

(12) The information processing apparatus according to (11), in which the control unit performs control to suppress the transmission of the sensor data from the sensor other than one or some sensors of a plurality of sensors belonging to the cluster.

(13) The information processing apparatus according to (11) or (12), in which the control unit calculates the degree of similarity by using local sensitivity hashing.

REFERENCE SIGNS LIST 11, 21, 41 sensor device
12 relay
13 data server
22, 42 sensor
23 difference calculating unit
24 transmission suppression control unit
25, 44 data transmitting unit
26 storage in sensor device
43 switch
44 data transmitting unit
45 transmission suppression control unit
47 antenna
131 data receiving unit
132 clustering unit
133 data degree-of-similarity estimating unit
134 transmission suppression command transmitting unit
135 data storage unit

The invention claimed is:

1. A sensor data processing apparatus, comprising:
a control unit configured to
calculate a value related to a difference between a plurality of pieces of sensor data generated by a sensor that measures an external environment and generates the sensor data at different points of time,
determine whether to suppress transmission of the sensor data from the sensor on a basis of the calculated value related to the difference, and
calculate a probability of transmission stop or probability of transmission of the sensor data with respect to the value related to the difference, the probability being based on a predetermined probability distribution,
wherein the control unit is implemented via at least one processor.

2. The sensor data processing apparatus according to claim 1,
wherein the control unit determines to suppress the transmission of the sensor data from the sensor in a case where the value related to the difference is smaller than a threshold value.

3. The sensor data processing apparatus according to claim 1,
wherein the predetermined probability distribution is a probability distribution in which as the value related to the difference becomes smaller, the probability of transmission stop of the sensor data becomes higher or the probability of transmission becomes lower.

4. The sensor data processing apparatus according to claim 1,
wherein the predetermined probability distribution is a probability distribution in which as the value related to the difference becomes smaller, the probability of transmission stop of the sensor data becomes lower or the probability of transmission becomes higher.

5. The sensor data processing apparatus according to claim 1,
wherein the control unit determines whether to suppress the transmission of the sensor data from the sensor further on a basis of a degree of congestion of a communication band.

6. The sensor data processing apparatus according to claim 5,
wherein the control unit is further configured to
measure strength of a transmitted radio wave of at least one other sensor data processing apparatus,
estimate a distance from the at least one other sensor data processing apparatus on a basis of this measurement result the measured strength, and
calculate a ratio of a number of other sensor data processing apparatuses the estimated distance of which is smaller than a threshold value to a total number of sensor data processing apparatuses as the degree of congestion.

7. The sensor data processing apparatus according to claim 6,
wherein the control unit calculates the probability of transmission stop or the probability of transmission of the sensor data, the probability being based on the degree of congestion and the predetermined probability distribution.

8. The sensor data processing apparatus according to claim 7,
wherein the predetermined probability distribution is a probability distribution in which as the degree of congestion becomes higher, the probability of transmission stop of the sensor data becomes higher or the probability of transmission becomes lower.

9. The sensor data processing apparatus according to claim 1, further comprising:
a data receiving unit configured to receive a plurality of pieces of sensor data of a plurality of sensors,
wherein the control unit is further configured to
calculate a degree of similarity between the plurality of pieces of sensor data for each cluster that spatially classifies the plurality of pieces of sensor data received on a basis of positions of the sensors, and
determine whether to suppress the transmission of the sensor data further on a basis of the calculated degree of similarity, and
wherein the data receiving unit is implemented via at least one processor.

10. The information processing apparatus according to claim 9,
wherein the control unit is further configured to perform control to suppress the transmission of the sensor data from the sensor other than one or some sensors of a plurality of sensors belonging to the cluster.

11. The information processing apparatus according to claim 10,
wherein the control unit calculates the degree of similarity by using local sensitivity hashing.

12. A sensor data processing method, comprising:
calculating a value related to a difference between a plurality of pieces of sensor data generated by a sensor that measures an external environment and generates the sensor data at different points of time;
determining whether to suppress transmission of the sensor data from the sensor on a basis of the calculated value related to the difference; and
calculating a probability of transmission stop or probability of transmission of the sensor data with respect to the value related to the difference, the probability being based on a predetermined probability distribution.

13. A sensor device, comprising:
a control unit configured to
calculate a value related to a difference between a plurality of pieces of sensor data generated by a sensor that measures an external environment and generates the sensor data at different points of time,
determine whether to suppress transmission of the sensor data from the sensor on a basis of the calculated value related to the difference, and
calculate a probability of transmission stop or probability of transmission of the sensor data with respect to the value related to the difference, the probability being based on a predetermined probability distribution,
wherein the control unit is implemented via at least one processor.

14. An information processing apparatus, comprising
a control unit that determines, on a basis of one or more pieces of sensor data generated by a sensor that measures an external environment and generates sensor data, configured to
calculate a value related to a difference between a plurality of pieces of sensor data generated by a sensor that measures an external environment and generates the sensor data at different points of time,
determine whether to suppress transmission of the sensor data from the sensor on a basis of the calculated value related to the difference, and
calculate a probability of transmission stop or probability of transmission of the sensor data with respect to the value related to the difference, the probability being based on a predetermined probability distribution,
wherein the control unit is implemented via at least one processor.

* * * * *